United States Patent

[11] 3,592,389

[72] Inventor Douglas Johnson
    Indianapolis, Ind.
[21] Appl. No. 879,111
[22] Filed Nov. 24, 1969
[45] Patented July 13, 1971
[73] Assignee General Motors Corporation
    Detroit, Mich.

[54] FLAP LINKAGE
    3 Claims, 5 Drawing Figs.
[52] U.S. Cl. .................................................. 239/265.27,
    239/265.39
[51] Int. Cl. ................................................ B64c 15/06
[50] Field of Search ......................................... 239/265.25,
    265.29, 265.33, 265.37, 265.39, 265.27

[56] References Cited
UNITED STATES PATENTS
| | | | |
|---|---|---|---|
| 3,426,974 | 2/1969 | Pendoley, Jr. et al. | 239/265.39 |
| 3,454,227 | 7/1969 | Motycka | 239/265.39 |

*Primary Examiner*—M. Henson Wood, Jr.
*Assistant Examiner*—John J. Love
*Attorneys*—Paul Fitzpatrick and Jean L. Carpenter ABSTRACT: A ring of flaps acts as a freely floating valve member between two concentric ducts. The flaps are interconnected for joint equal radial movement by a linkage comprising a circular endless lazy-tongs linkage with one pivot on each flap and a parallelogram linkage for each pivot which maintains the pivot radial notwithstanding the swinging movement of the flaps.

INVENTOR.
Douglas Johnson
BY
Paul Fitzpatrick
ATTORNEY

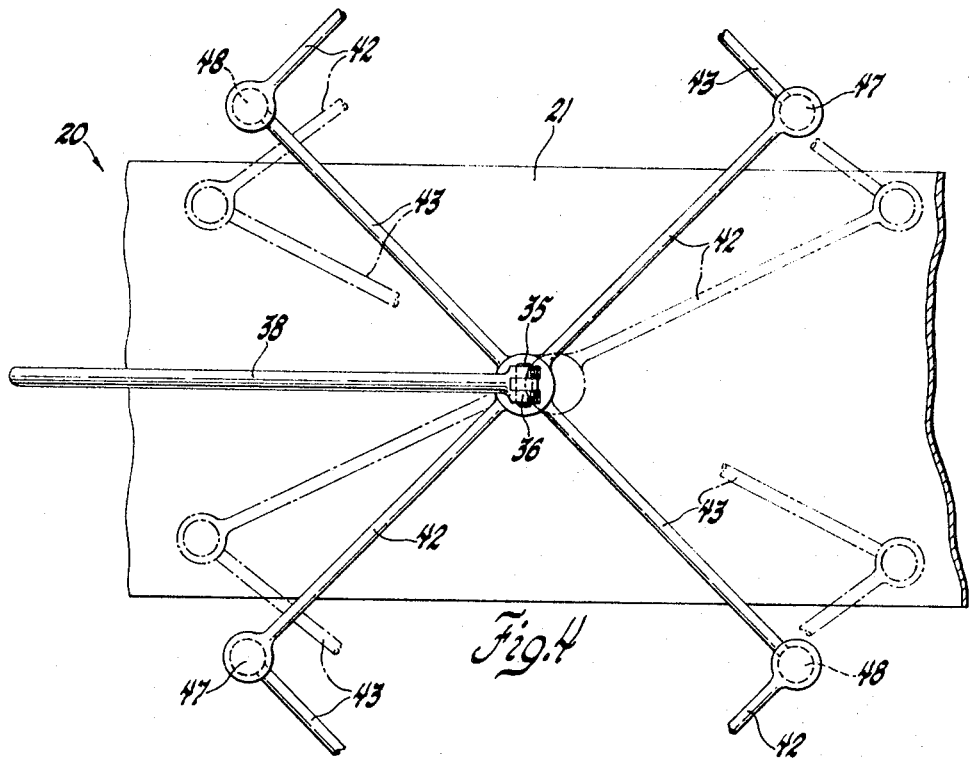
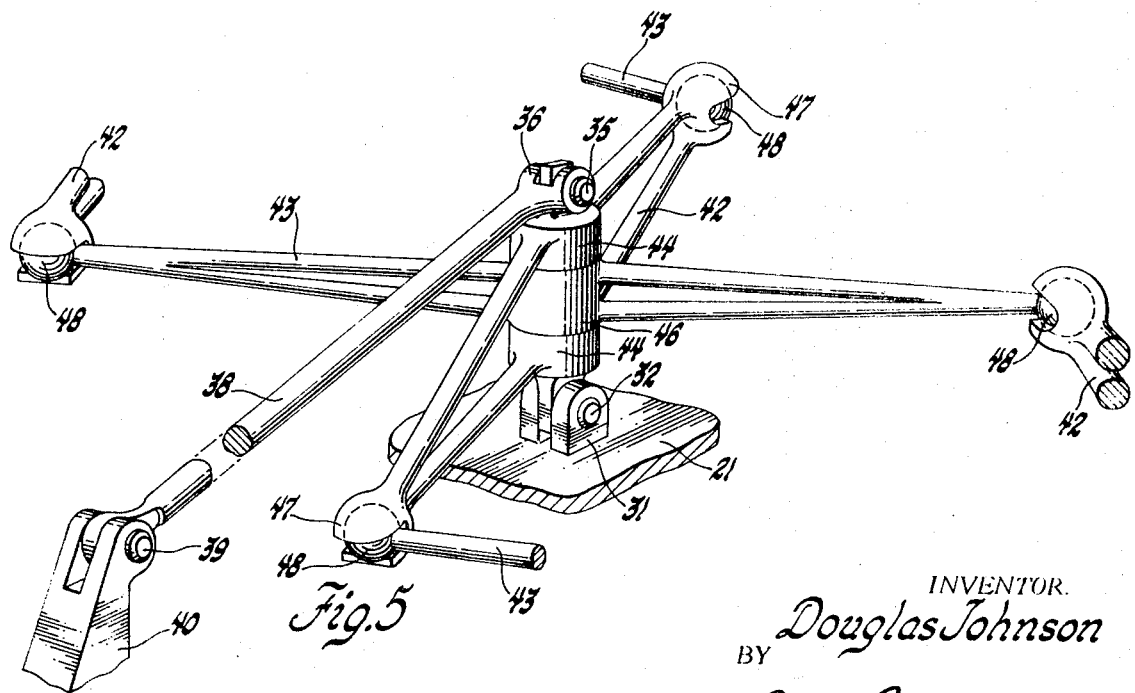
INVENTOR.
Douglas Johnson
BY
Paul Fitzpatrick
ATTORNEY

FLAP LINKAGE

The invention herein described was made in the course of work under a contract or subcontract thereunder with the Department of Defense.

My invention relates to improvements in rings of flaps which are used for such purposes as variable exhaust nozzles for jet engines, variable boattail fairings for nacelles, valves to control the division of flow or to provide for better mixing conditions between flows in annular ducts, and for any other purpose for which a ring acting as a variable convergent or divergent flow-directing member is needed.

Rings of variable flaps, which in practice may constitute alternating master and slave flaps so as to preserve circumferential continuity notwithstanding the expansion and contraction of the device, are very well known for various purposes. One application is to varying the area of convergent or convergent-divergent nozzles used in jet propulsion engines. In some cases each flap or each alternate flap is coupled to some actuating mechanism so that all of the flaps are positively moved concurrently inwardly and outwardly to vary the area of the device. Examples of such are to be found in the patent literature. Another application of such flaps, to which the present invention is more particularly directed, is in arrangements for providing a free-floating variable valve member between two concentric ducts carrying gas, as in a ducted-fan-type engine.

Particularly with the free-floating type of flaps there has been a great deal of difficulty because of the failure of all of the flaps to move the same amount so as to preserve a strictly circular or annular exit of constant radius or width. Uneven movement may cause jamming and failure. The purpose of my invention is to provide simple and reliable means for coupling a ring of flaps so that they are constrained to move uniformly together in their inward-outward swinging movement, but of such character that there is no tendency for the linkage to bind or fail and interfere with the free operation of the flaps.

The principal objects of my invention are to provide an annular nozzle or valve member comprising a ring of flaps which are movable inward and outward to vary the area or size of the device and in which there is provided a linkage which constrains the parts to move in unison. A further object is to provide a linkage for this purpose which is simple and reliable; a further object of the invention is to improve the structure of annular valve or flow-controlling devices which are used in turbofan engines and other devices of the sort.

The nature of my invention and its advantages will be clear to those skilled in the art from the succeeding detailed description of the preferred embodiment of the invention and the accompanying drawings thereof.

FIG. 4 is a developed view of a portion of the nozzle linkage taken on the plane indicated by the line 4-4 in FIG. 1.

FIG. 5 is an axonometric view of a portion of the nozzle linkage.

Figures 1, 2, 3:
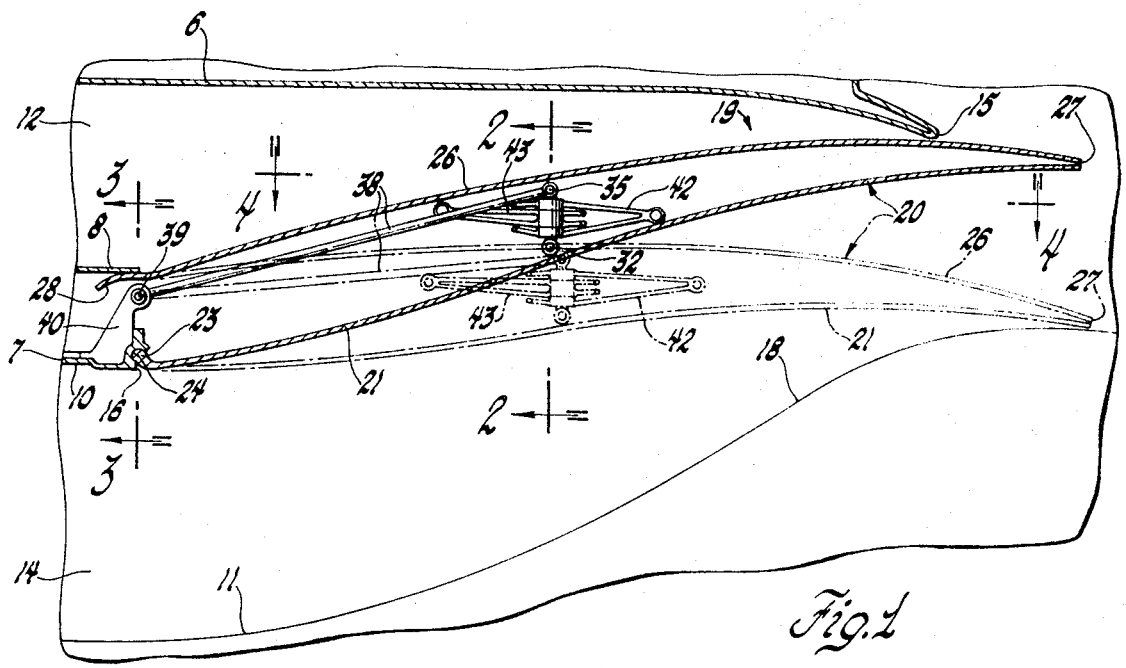
FIG. 1 is a sectional view of a portion of the exhaust end of a ducted-fan aircraft engine.
FIG. 2 is partial cross-sectional view of the same taken on the plane indicated by the line 2-2 in FIG. 1.
FIG. 3 is a fragmentary cross-sectional view taken on the plane indicated by the line 3-3 in FIG. 1.

FIG. 1 illustrates a portion of the turbofan-type engine downstream of the turbine and fan with means for controlling the exhaust from the fan duct and from the gas turbine. The engine comprises an outer wall or casing 6, an intermediate wall or casing 7 which specifically is illustrated as double walled, comprising two mutually adjacent walls 8 and 10, and an inner wall 11 which specifically includes diverging bullet 18 which may be mounted on the axis of the engine downstream of the turbine (not illustrated). The walls 6 and 8 define between them a duct 12 which may be the fan duct of the engine. The walls 10 and 11 define between them a duct 14 which may be the exhaust from a turbine (not illustrated) forming part of the engine. The outer wall terminates in a circular outlet end 15. The intermediate wall terminates at 16 upstream of the end 15. The inner wall or bullet 11 continues downstream of the outer wall end 15.

In certain engines there is the need for means movable between the outer wall or nozzle 15 and the bullet 18 in accordance with varying flow conditions in the ducts 12 and 14. Such means may take the form of a variable valve ring or variable nozzle ring made up of a ring of master flaps 20, each flap having an inner wall 21 the forward end of which terminates in a hinge pin 23 which can rotate to a small extent in a socket 24 extending tangentially to the outlet end of the duct 14. Each flap 19 also includes an outer wall 26 spaced from the wall 21 except at the downstream end 27. The inner wall 21 is aligned with wall 10 and the outer wall 26 with wall 8 of the intermediate wall 7. Walls 26 comprise an arcuate forward end 28 which is in sliding contact with the downstream end of wall 8. The ring of flaps may move from the outermost position indicated in solid lines in FIG. 1 in which wall 26 abuts the nozzle 15 to an innermost position in which the tip 27 of the flap is in contact with bullet 18, as indicated in broken lines.

In the particular device illustrated, these flaps are free floating and assume a position in response to the gas pressures exerted upon the respective faces of the flaps. The flaps are arranged in a circular array, the angles between the flaps being somewhat exaggerated in FIG. 2 for clarity and, as is usual, slave flaps 30 of suitable configuration indicated partially in FIG. 2 may be provided to bridge the gaps between the main flaps 20 when they are opened from their position at which they are closest together. Details of such slave flaps are clearly immaterial to the present invention and, therefore, they are not illustrated. They serve to preserve the continuity of the inner and outer walls of the nozzle ring 19. So far as my present invention is concerned, the structure so far described bay be considered as conventional or as merely illustrative of a suitable environment for the linkage which I have devised.

Proceeding now to a description of the flap synchronizing or regulating linkage, each master flap 20 has welded or otherwise fixed to its outer wall 21 a clevis 31 in which is mounted a hinge pin 32 on which is mounted a pivot 34 which is a cylindrical pin having one end flattened to fit within the clevis 31 and bored to receive the pin 32. The other end of pivot 34 is also flattened and is coupled by a pin 35 to the clevis end 36 of a link 38. The other end of link 38 is coupled by a hinge pin 39 to a bracket 40 fixed to and extending from the wall 10 and thus forming part of the intermediate wall 7. The axes of the hinges at 23, 39, 35, and 32 form a parallelogram and the direction from hinge axis 23 to hinge axis 39 is directly radial or perpendicular to the axis of the nozzle. Thus, the pivot 34 is constrained to remain perpendicular to the axis of the engine as the flap 20 swings inward and outward.

Each pivot mounts two pieces of a lazy-tongs linkage, a piece 42 and a piece 43. Preferably, as illustrated, the piece 42 straddles the piece 43, the former having two hubs 44 and the latter having a hub 46 journaled on the pivot 34. Each piece 42 or 43 has a universal joint connection with the piece 43 or 42, respectively, on each adjoining master flap. The universal joint connection is needed to accommodate the mode of movement of the pieces of the adjacent sets. As illustrated, each end of the piece 42 defines a socket 47 and each end of the piece 43 terminates in a ball 48. The balls 48 are journaled for universal movement in the sockets 47.

The arrangements described, by maintaining the axes about which the pieces 42 and 43 swing radial to the axis of the nozzle, insures that the ends of these pieces swing in a common plane for each nozzle perpendicular to the radial direction of the pivot 34. Thus, there is no opportunity for the circular lazy-tongs linkage to become cocked or misaligned and thereby oppose the free movement of the flaps. On the other hand, the movement of each flap is communicated to the two adjacent flaps so that unison of radial swinging of the flaps is assured.

It is possible, of course, to have one socket end and one ball end on each piece 42, 43 if desired. Other forms of universal connection between the ends of these pieces might be adopted if desired. It may also be noted that the outer wall 26 of the flap together with the inner wall 21 provides an enclosure or housing for the linkage protecting it from the gas stream. This is desireable but not always essential. It will be realized that the mechanism shown for synchronizing the movements of the flaps could be used in a device in which the flaps are bodily moved by some external actuator suitably connected to some of the flaps, as well as in a device in which the flaps respond to gas pressure as here illustrated.

It should be clear to those skilled in the art from the foregoing that I have devised a linkage particularly adapted to secure the desired end of preserving uniformity of movement and true roundness in a variable flap organization of the general character described.

The detailed description of the preferred embodiment of the invention for the purpose of explaining the principles thereof is not to be considered as limiting or restricting the invention, as many modifications may be made by the exercise of skill in the art.

I claim:

1. A variable-area device comprising a substantially circular support, a ring of flaps movable in unison hinged to the support, each flap being coupled to the support by a hinge having an axis extending generally tangential to the said support at the flap; and means coupling the flaps for equal concurrent inward and outward movement comprising a pivot hinged to each flap and extending perpendicularly to the axis of the ring of flaps, a link hinged to each pivot and hinged to the support, the configuration being such that the support, flap, pivot, and link define a parallelogram linkage maintaining the pivot perpendicular to the said axis, and a circular endless lazy-tongs linkage comprising a pair of crossed pieces pivoted on each said pivot and swivel connections between the ends of the pieces and the ends of the pieces mounted on the next adjacent flaps.

2. A variable-area device comprising a duct wall having a substantially circular end, a ring of flaps movable in unison hinged to the duct wall at the end, each flap being coupled to the wall by a hinge having an axis extending generally tangential to the said end at the flap; and means coupling the flaps for equal concurrent inward and outward movement comprising a pivot hinged to each flap and extending perpendicularly to the axis of the ring of flaps, a link hinged to each pivot and hinged to the duct wall, the configuration being such that the duct wall, flap, pivot, and link define a parallelogram linkage maintaining the pivot perpendicular to the said axis, and a circular endless lazy-tongs linkage comprising a pair of crossed pieces pivoted on each said pivot and swivel connections between the ends of the pieces and the ends of the pieces mounted on the next adjacent flaps.

3. The combination of an outer wall, an intermediate wall, and an inner wall, the walls being substantially coaxial and of substantially circular cross section, the outer and intermediate walls defining an annular outer duct and the intermediate and inner walls defining an annular inner duct, the outer and inner walls extending beyond an end of the intermediate wall to define an annular passage; a ring of flaps pivoted on axes generally tangent to the intermediate wall at the said end and movable in unison to vary inversely the flow area between the respective ducts and the passage; and means to couple the flaps for movement in unison comprising a circular endless lazy-tongs linkage having pieces crossed on pivots extending from the flaps and a parallelogram linkage coupling each said pivot to the intermediate wall effective to maintain the pivot perpendicular to the axis of the ring of flaps.